US006934321B2

(12) United States Patent
Sato

(10) Patent No.: US 6,934,321 B2
(45) Date of Patent: Aug. 23, 2005

(54) W-CDMA TRANSMISSION RATE ESTIMATION METHOD AND DEVICE

(75) Inventor: Takeshi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 824 days.

(21) Appl. No.: 09/840,823

(22) Filed: Apr. 25, 2001

(65) Prior Publication Data

US 2001/0040916 A1 Nov. 15, 2001

(30) Foreign Application Priority Data

May 9, 2000 (JP) ....................................... 2000-135636

(51) Int. Cl.[7] .......................... H04B 1/69; H04B 1/707; H04B 1/713

(52) U.S. Cl. ........................ 375/150; 370/320; 370/335

(58) Field of Search ................................ 375/150, 341, 375/225; 370/253

(56) References Cited

U.S. PATENT DOCUMENTS

| | | | | |
|---|---|---|---|---|
| 5,638,408 A | * 6/1997 | Takaki | 375/341 |
| 5,757,850 A | * 5/1998 | Takaki | 375/225 |
| 5,774,496 A | * 6/1998 | Butler et al. | 375/225 |
| 5,796,757 A | * 8/1998 | Czaja | 714/789 |
| 6,167,079 A | * 12/2000 | Kinnunen et al. | 375/225 |
| 6,473,442 B1 | * 10/2002 | Lundsjo et al. | 370/537 |
| 6,501,748 B1 | * 12/2002 | Belaiche | 370/342 |
| 6,687,233 B1 | * 2/2004 | Chen et al. | 370/253 |
| 6,707,859 B1 | * 3/2004 | Kinnunen et al. | 375/316 |
| 2002/0027883 A1 | * 3/2002 | Belaiche | 370/252 |
| 2002/0094011 A1 | * 7/2002 | Okumura et al. | 375/130 |
| 2002/0131532 A1 | * 9/2002 | Chi et al. | 375/341 |
| 2002/0141331 A1 | * 10/2002 | Mate et al. | 370/218 |
| 2004/0240471 A1 | * 12/2004 | Terry | 370/469 |

FOREIGN PATENT DOCUMENTS

| | | |
|---|---|---|
| EP | 0 763 902 A1 | 3/1997 |
| GB | 2 344 731 A | 6/2000 |
| JP | 9-172428 | 6/1997 |
| JP | 10-285653 A | 10/1998 |
| JP | 11-340840 | 12/1999 |
| JP | 11-355150 | 12/1999 |
| JP | 2001-127724 A | 5/2001 |
| WO | 97/05717 | 2/1997 |
| WO | WO 00/16512 A1 | 3/2000 |

OTHER PUBLICATIONS

3rd Generation Partnership Project; Technical Specification Group Radio Access Network; "Multiplexing and Channel Coding (FDD)", 3GPP TS 25.212 V3.5.0 (Dec. 2000), pp. 1–62.

Y. Okumura et al., "Variable–Rate Data Transmission with Blind Rate Detection for Coherent DS–CDMA Mobile Radio", IEICE Trans. Commun., vol. E81–B, No. 7, (Jul. 1998), pp. 1365–1373.

N. Iwakiri, "Variable Data Rate Transmission using Viterbi Decoder with Rate Decision Technique", YRP Mobile Telecomm. Key Tech. Res. Lab. Co., Ltd., (Aug. 30, 1996), pp. 302–B–301.

* cited by examiner

*Primary Examiner*—Stephen Chin
*Assistant Examiner*—Harry Vartanian
(74) *Attorney, Agent, or Firm*—Sughrue Mion, PLLC

(57) ABSTRACT

In a W-CDMA transmission rate estimation method, a maximum likelihood transport format combination is selected from a plurality of transport format combinations representing bit length combinations constituting a plurality of transport channels, each having a variable bit length, on the basis of correlation strengths between a normal encoded bit string and bit strings of data obtained by performing Viterbi decoding processing for data, of a reception output constituted by the respective transport channels, which corresponds to an arbitrary transport channel. A data transmission rate is then estimated on the basis of the selected combination. A W-CDMA transmission rate estimation device is also disclosed.

12 Claims, 7 Drawing Sheets

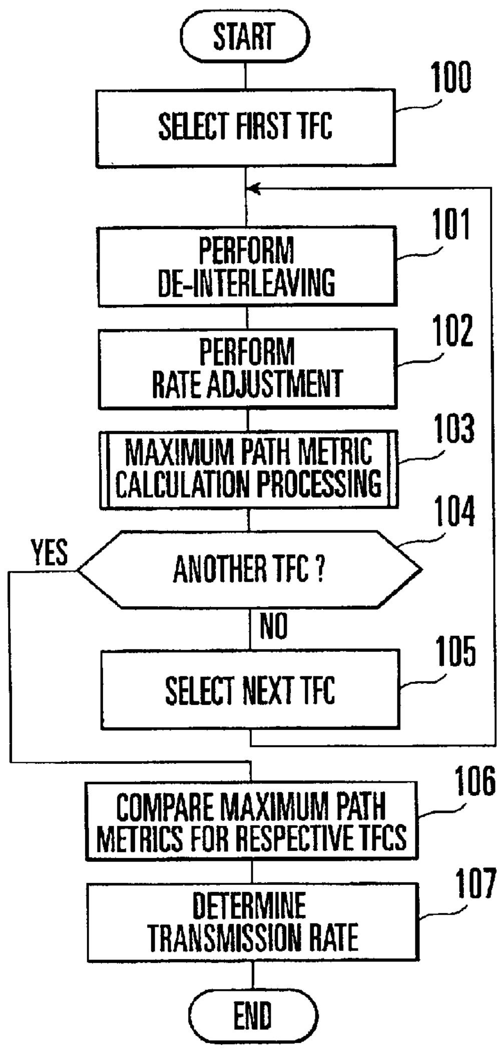
FIG.8A
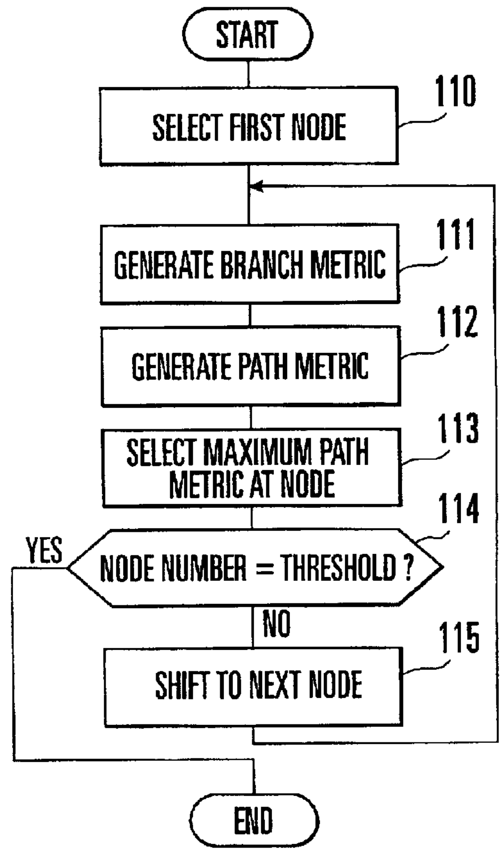
FIG.8B
FIG.9A
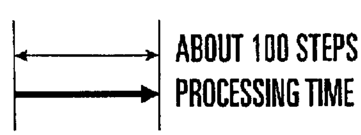
FIG.9B
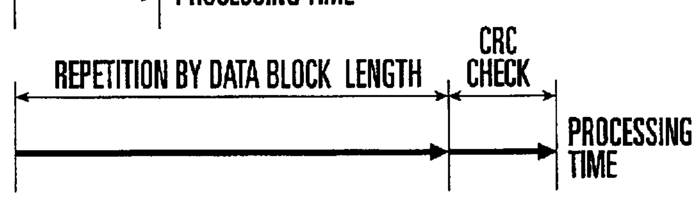

W-CDMA TRANSMISSION RATE ESTIMATION METHOD AND DEVICE

BACKGROUND OF THE INVENTION

The present invention relates to a W-CDMA transmission rate estimation method and device and, more particularly, to a W-CDMA transmission rate estimation method and device for estimating a transmission rate by using path metrics obtained in a Viterbi decoding process.

Schemes for IMT2000 W-CDMA system have been studied in 3GPP. A W-CDMA requires several parameters for implementing general functions in transmission processing and reception processing in FIGS. 1 and 2 to be described later. In W-CDMA or the like in which data with different transmission rates are integrated and transmitted, a parameter called a bit length is especially important for almost all functions.

As the function of notifying the receiving side of this bit length, a technique of sending information data called a TFCI (Transport Format Combination Indicator) has been studied (e.g., reference 1: Multiplexing and Channel Coding, 3G TS25.212 V3.1.1/1999-12).

Since the bit length parameter can change every 10 ms, the receiving side needs to know this parameter every 10 ms. The receiving side must therefore receive a TFCI every 10 ms. To eliminate the inconvenience of handling such a TFCI and effectively use channel capacity, a transmission rate estimation method (Blind Rate Detection) of estimating a bit length parameter on the receiving side without sending this TFCI has been proposed and studied (e.g., references 1 and 2: Yukihiko Okamura and Fumiyuki Adachi, "Variable-Rate Data Transmission with Blind Rate Detection For Coherent DS-CDMA Mobile Radio").

Several methods of estimating a transmission rate have been proposed in IS-95 systems as early-type CDMA systems have been proposed (e.g., Japanese Patent Laid-Open Nos. 11-355150, 9-172428, 10-507333, and 11-340840). In these schemes, however, there is no concept that a plurality of TrCH (transport channel) data exist on one channel. Since a W-CDMA system is designed to estimate a transmission rate when a plurality of TrCHs exist on one channel, it is difficult to apply these schemes to this system without any modification.

For estimation of a transmission rate in a W-CDMA system, a method of obtaining a bit length on the receiving side by using path metrics obtained in a Viterbi decoding process (reference 2). This scheme is based on a predetermined data structure (called Fixed Position), and hence is difficult to apply to a new data structure (called Flexible Position). For this reason, a method using CRC is also under study for a new data structure (reference 1).

In such a conventional W-CDMA transmission rate estimation method, however, it takes much time for transmission rate estimation processing for the following reasons, and hence high-speed processing cannot be performed.

First, in the method using the predetermined data structure (Fixed Position), a blank portion called DTX (Discontinuous Transmission) must be prepared in data, and the step of adding or deleting such portion is required.

Second, in the method using CRCs, transmission rate estimation waits until all bits of one block input to a Viterbi decoding section are received, and hence a processing delay becomes large. Since a CRC check is required until transmission rate estimation is completed, the processing time prolongs. In addition, if a CRC check fails, estimation error may occur.

SUMMARY OF THE INVENTION

The present invention has been made to solve the above problem, and has as its object to provide a W-CDMA transmission rate estimation method and apparatus which can greatly shorten the time required for transmission rate estimation processing.

In order to achieve the above object, according to the present invention, there is provided a W-CDMA transmission rate estimation method comprising selecting a maximum likelihood transport format combination of a plurality of transport format combinations representing bit length combinations constituting a plurality of transport channels, each having a variable bit length, on the basis of correlation strengths between a normal encoded bit string and bit strings of data obtained by performing Viterbi decoding processing for data, of a reception output constituted by the respective transport channels, which corresponds to an arbitrary transport channel, and estimating a data transmission rate on the basis of the selected combination.

BRIEF DESCRIPTION OF THE DRAWINGS

FIGS. 8A and 8B are flow charts showing the operation of a reception processing section which includes W-CDMA transmission rate estimation processing according to the first embodiment of the present invention;

FIGS. 9A and 9B are views for explaining a comparison between the time required for transmission rate estimation processing in the first embodiment of the present invention and that in the conventional method (Blind Rate Detection);

DESCRIPTION OF THE PREFERRED EMBODIMENTS

Embodiments of the present invention will be described next with reference to the accompanying drawings.

Figure 1:
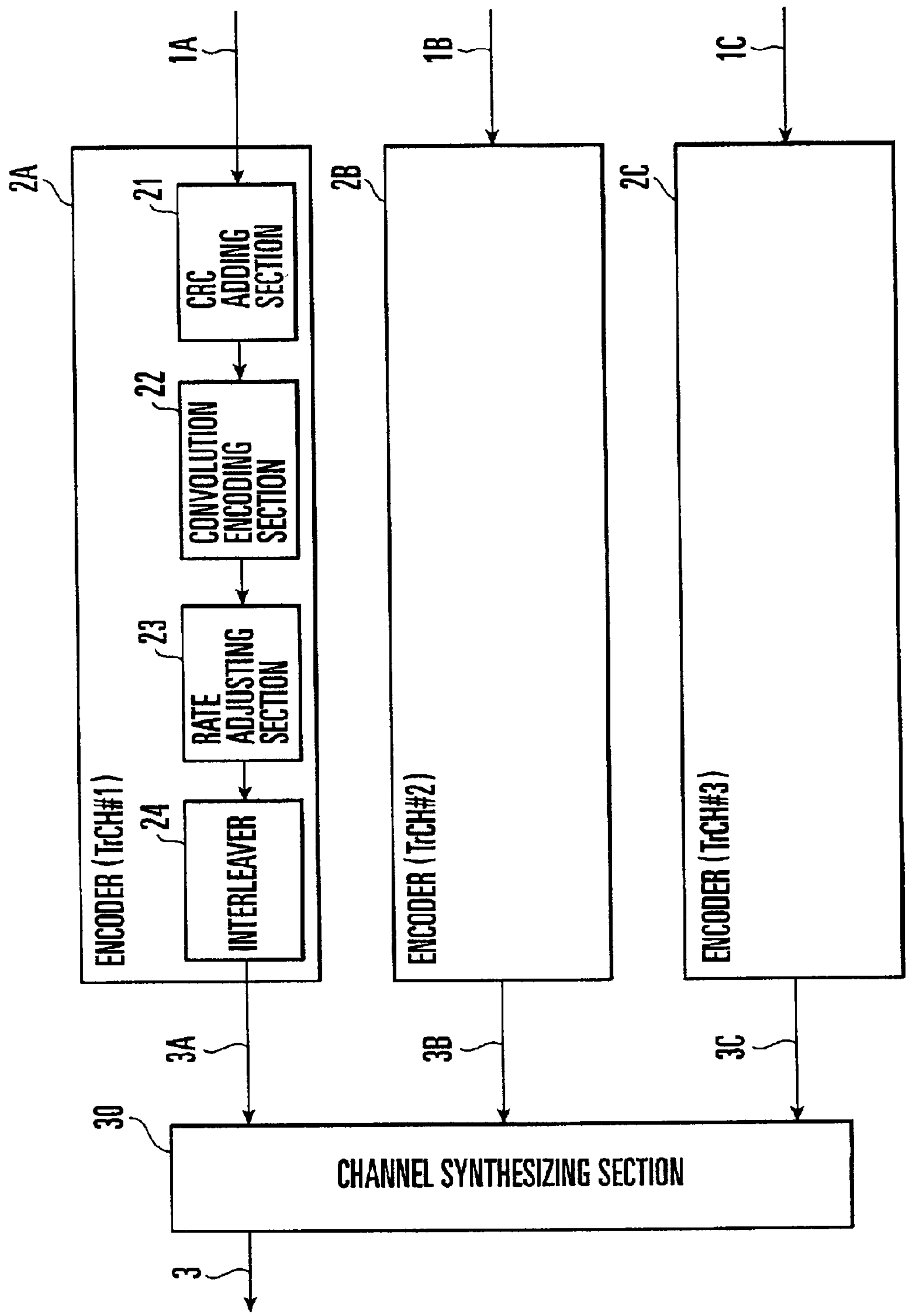
FIG. 1 is a functional block diagram showing a transmission processing section on the transport channel in a general W-CDMA system to which a W-CDMA transmission rate estimation device according to an embodiment of the present invention is applied.
Figure 2:
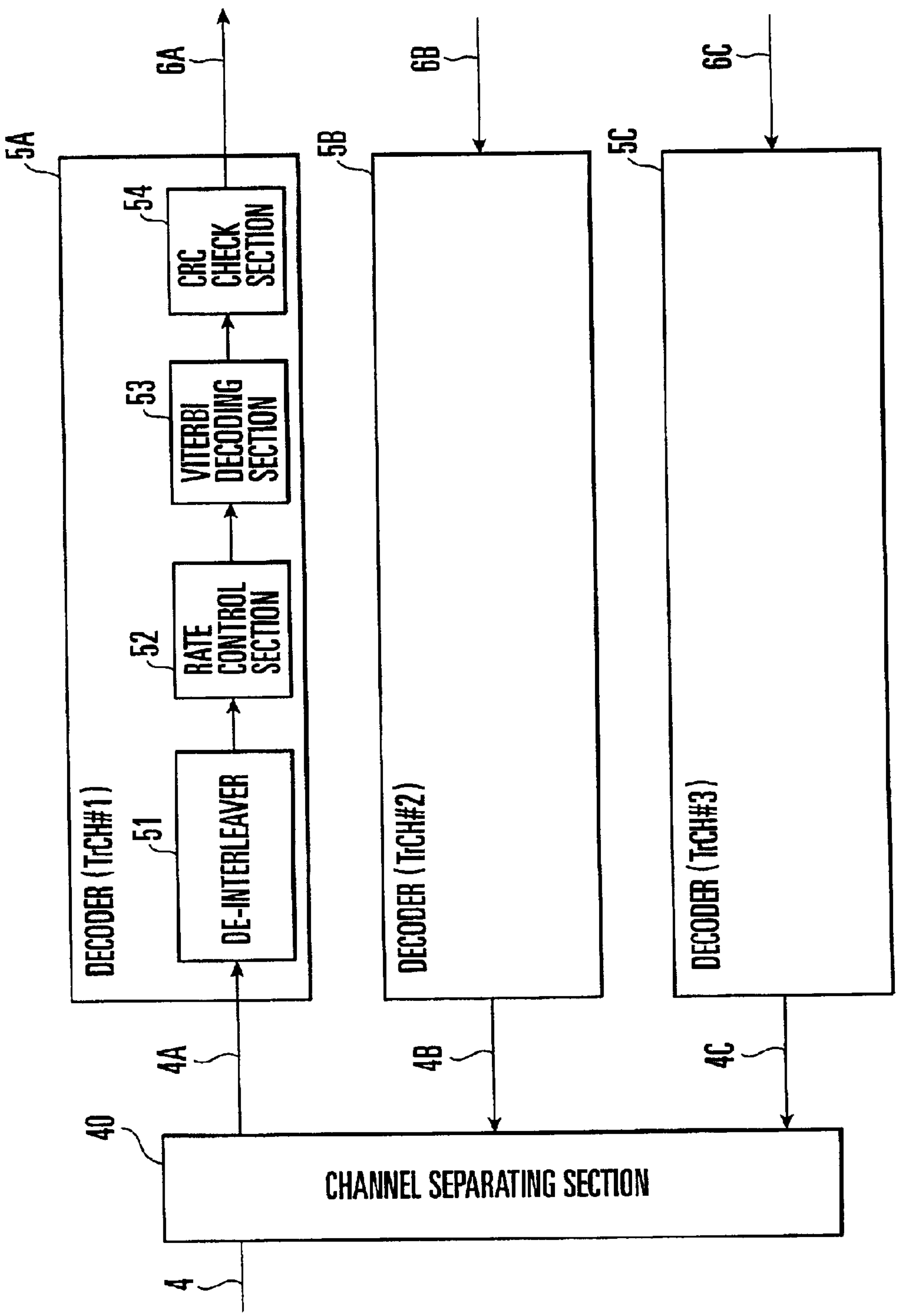
FIG. 2 is a functional block diagram showing a reception processing section on the transport channel in the general W-CDMA system.

FIG. 1 shows a transmission processing section on the transport channel in a general W-CDMA system to which a W-CDMA transmission rate estimation device according to an embodiment of the present invention is applied. FIG. 2 shows a reception processing section on the transport channel in the general W-CDMA system.

The arrangement shown in FIG. 1 includes encoders 2A to 2C for performing transmission processing for three services, i.e., the respective transport channels (TrCHs). The encoder on each transport channel performs the following operation.

First of all, in the encoder 2A corresponding to TrCH#1, a CRC adding section 21 adds a CRC for an error check to a data block lA transferred from an upper layer, and a convolution encoding section 22 performs error correction encoding, convolution encoding in this case. A rate adjusting section 23 decreases (Puncturing) or increases (Repeating) the number of encoded bits to match the bit length of the data block to a desired bit length that can be transmitted on a physical channel, thereby performing rate adjustment (Rate Matching).

Subsequently, an interleaver 24 performs interleaving to generate a data block 3A with the desired bit length. With regard to other channels TrCH#2 and TrCH#3, the encoders 2B and 2C, each having the same arrangement as that of the encoder 2A, perform similar processing to generate data blocks 3B and 3C with the desired bit length from input data blocks 1B and 1C.

The data blocks 3A to 3C generated by the encoders 2A to 2C in this manner are synthesized into one transmission output 3 by a channel synthesizing section 30 and transmitted over one physical channel.

The arrangement shown in FIG. 2 includes decoders 5A to 5C for performing reception processing for the three transport channels, respectively. The decoder on each transport channel performs the following operation. Note that the operation performed by each decoder is substantially the reverse of the operation performed by the corresponding encoder described above.

First of all, a reception output 4 received via one physical channel is separated into data blocks 4A to 4C corresponding to the respective transport channels by a channel separating section 40 and input to the decoders 5A to 5C.

First of all, in the decoder 5A, a de-interleaver 51 de-interleaves the data block 4A, and a rate control section 52 performs the reverse of the processing performed in each of the encoders 2A to 2C.

Subsequently, a Viterbi decoding section 53 performs error correction decoding, convolution decoding in this case, and a CRC check section 54 checks a CRC for an error check. An obtained data block 6A is transferred to an upper layer.

With regard to the remaining channels TrCH#2 and TrCH#3, the decoders 5B and 5C, each having the same arrangement as that of the decoder 5A, perform similar processing to obtain data blocks 6B and 6C.

Figure 3:
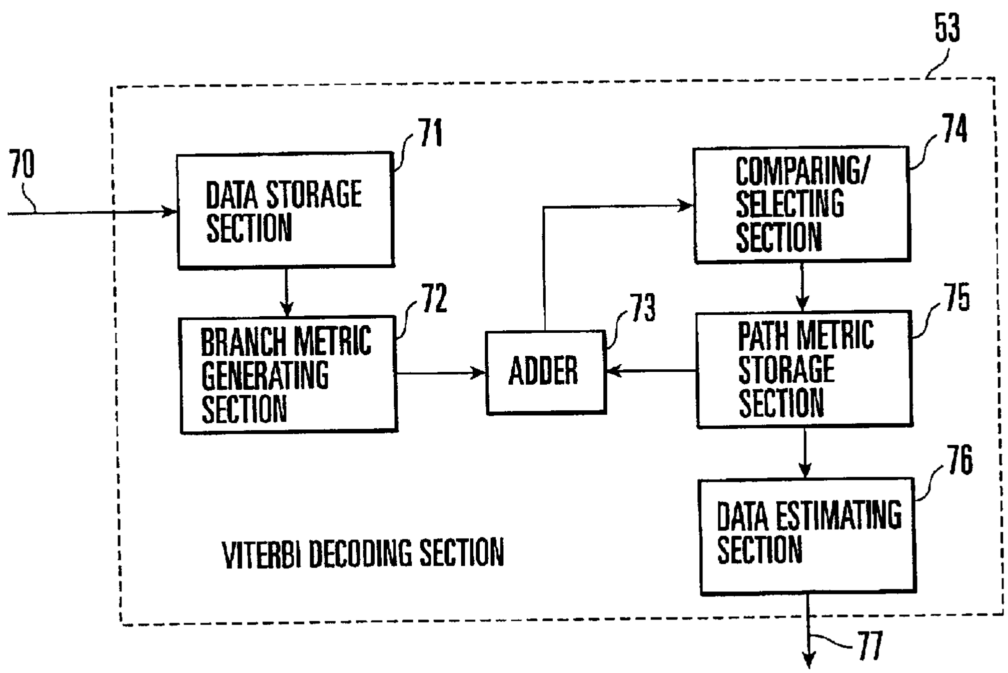
FIG. 3 is a functional block diagram showing the arrangement of the basic main part of a Viterbi decoding section.

The W-CDMA transmission rate estimation device of the present invention is incorporated in the Viterbi decoding section 53 of each of the decoders 5A to 5C shown in FIG. 2. FIG. 3 shows the arrangement of the basic main part of a Viterbi decoding section.

Referring to FIG. 3, when data 70 is input to the Viterbi decoding section 53, the data is temporarily stored in a data storage section 71, and a branch metric generating section 72 generates a branch metric used in a Viterbi algorithm. An adder 73 then adds the value of this branch metric to the value stored in a path metric storage section 75.

A comparing/selecting section 74 compares the output from the adder 73 with the value stored in the path metric storage section 75, selects a larger one, and stores it in the path metric storage section 75. In this manner, the operation from the branch metric generating section 72 to comparing/selecting section 74, i.e., ACS (Add Compare Select) operation, is repeated the number of times corresponding to the trellis length.

Subsequently, decoding processing is performed upon tracking back, by a predetermined bit length, from the processing time at which the maximum likelihood path metric is obtained by a data estimating section 76, thereby generating decoded data 77. With this operation, the Viterbi decoding section completes the decoding processing.

The W-CDMA transmission rate estimation device according to this embodiment is obtained by improving this Viterbi decoding section. Conventionally, a transmission rate estimation device is formed by improving this Viterbi decoding section.

Figure 4:
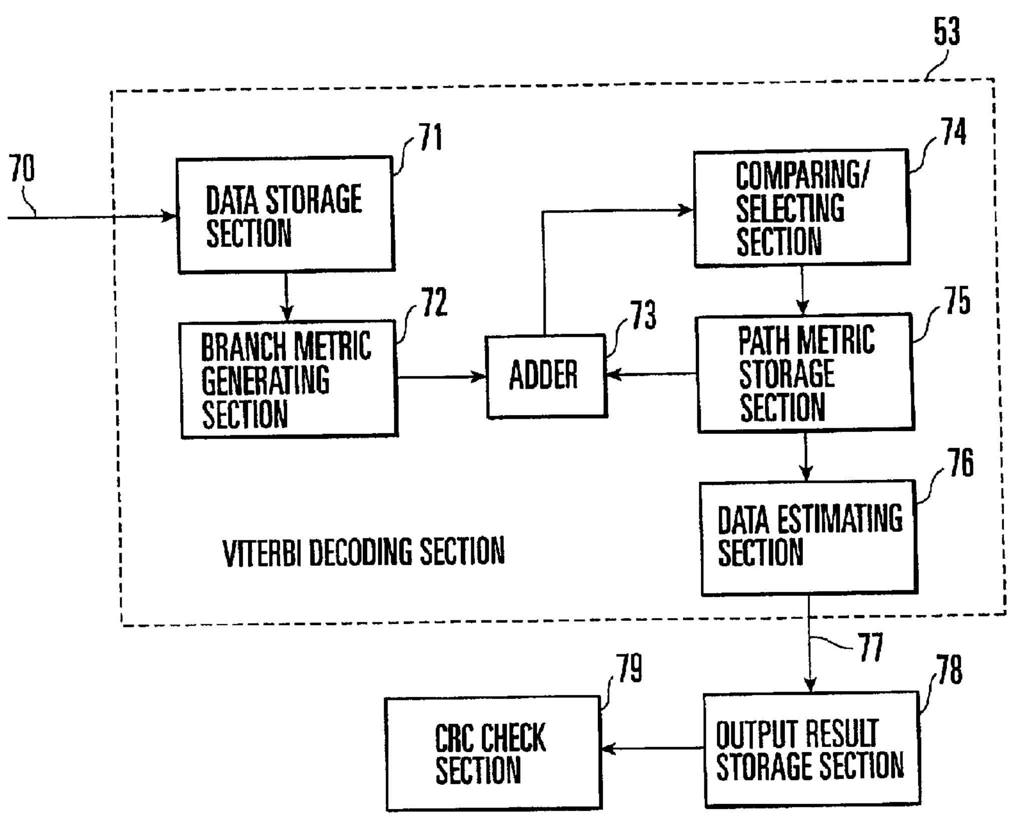
FIG. 4 is a functional block diagram showing a conventional transmission rate estimation device.

For example, as shown in FIG. 4, the decoded data 77 output from the data estimating section 76 of the Viterbi decoding section 53 described above is stored in an output result storage section 78, and a CRC check section 79 makes a CRC check on this data. A transmission rate is then determined in accordance with the check result.

Figure 5:
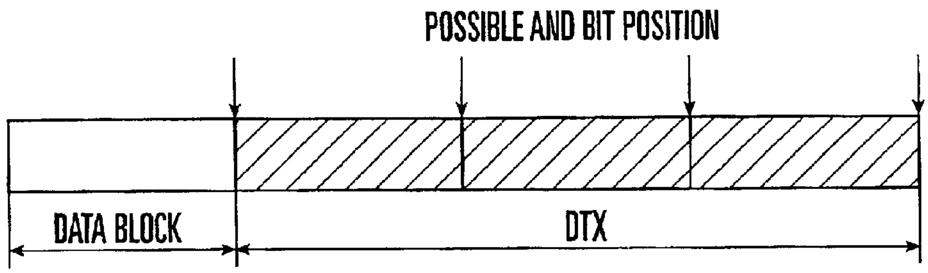
FIG. 5 is a view for explaining a data structure (Fixed Position) used in the transmission rate estimation device in FIG. 4.

This arrangement is, however, based on the premise that a data structure like the one shown in FIG. 5 is to be handled. According to the data structure in FIG. 5, a finite number of data blocks (in this case, data block count=4 and each block length is equal) are set, and data is always input to the Viterbi decoding section with a data length of a maximum of four data blocks (Fixed Position). In this case, even if only one data block is present, the data is handled as data with a bit length of four blocks, and a portion having no data is determined by FLAG (the hatched portion) called DTX (Discontinuous Transmission).

When data having this structure is input to the Viterbi decoding section and operated in the same manner as in FIG. 3, no change in path metric value occurs in a DTX portion having no data. In practice, owing to the influence of thermal noise, a change in path metric value is not completely eliminated but is reduced.

The number of bit positions where DTX starts is limited to four as indicated by the arrows in FIG. 5, and it is uniquely defined according to the characteristics of the trellis termination of a convolution code that the register of an encoder is set uniquely to zero state at the bit end position of data. A characteristic feature of a conventional method is that a data block length is detected by obtaining a DTX starting position by using the characteristics described above.

Figure 6:
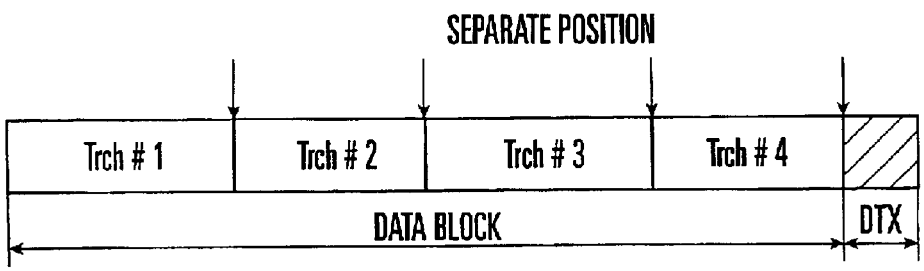
FIG. 6 is a view for explaining a data structure (Flexible Position) used in a W-CDMA system.

Attempts have also been made to handle a data structure like the one shown in FIG. 6 (Flexible Position) as well as the data structure in FIG. 5, as described above, in consideration of channel utilization efficiency (see reference 1 or the like).

The data structure shown in FIG. 6 is the data structure of the reception output 4 input to the channel separating section 40 in FIG. 2. FIG. 6 shows a state where a plurality of transport channels are synthesized. This data structure differs from the data structure in FIG. 5 in that no DTX is inserted between the respective transport channels.

It is therefore difficult to estimate the transmission rate of a signal having the data structure shown in FIG. 6 by the conventional method (Blind Rate Detection) using DTX.

Combinations of the bit lengths of transport channels in FIG. 6 are limited to a certain number. For example, a combination is set such that if the bit length of TrCH#1 is known, the bit lengths of the three remaining transport channels are uniquely determined. This is called a transport format combination (TFC).

Therefore, to obtain the bit length of TrCH#1, i.e., properly select one of several transport format combinations (called TFCS: TFC Set), is to estimate a transmission rate.

The reason why a bit length is obtained is that the bit length is required for operation by the de-interleaver 51 and rate control section 52. For this reason, if the bit length of each transport channel is not obtained in the processing performed by the channel separating section 40, the subsequent operation cannot be performed. The bit length of each transport channel must therefore be known as early as possibly. According to the method of notifying the bit length of each transport channel by transmitting data, since this data is transmitted at certain time intervals, each function cannot be executed until the data is received.

Figure 7:
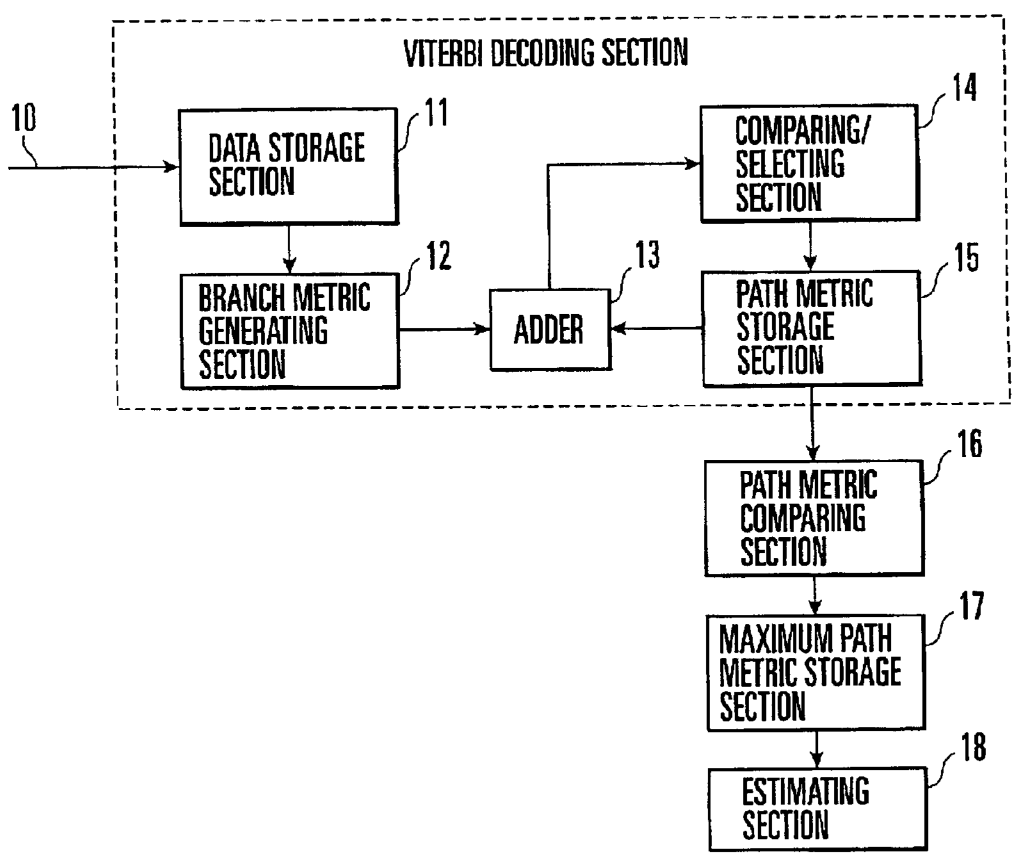
FIG. 7 is a functional block diagram showing a W-CDMA transmission rate estimation device according to the first embodiment of the present invention.

The W-CDMA transmission rate estimation device according to this embodiment will be described next with reference to FIG. 7. FIG. 7 shows the W-CDMA transmission rate estimation device according to this embodiment. This W-CDMA transmission rate estimation device has almost the same arrangement as that of the device described above except that the data estimating section 76 of the Viterbi decoding section in FIG. 3 is modified.

The W-CDMA transmission rate estimation device in FIG. 7 includes a data storage section 11 for temporarily storing the input data 10, a branch metric generating section 12 for generating a branch metric from the data stored in the data storage section 11, a path metric storage section 15 for storing a path metric value, an adder 13 for calculating the sum of the value of the branch metric generated by the branch metric generating section 12 and the value of the path metric stored in the path metric storage section 15, and a comparing/selecting section 14 for comparing an output from the adder 13 with the value of the path metric stored in the path metric storage section 15 to select a surviving path in a trellis diagram.

In addition to these components, this device includes a path metric comparing section 16 for obtaining the maximum path metric value corresponding to a transport format combination at each time point from the path metric values stored in the path metric storage section 15, a maximum path metric storage section 17 for storing the maximum path metric value selected by the path metric comparing section 16, and an estimating section 18 for selecting the maximum path metric among all transport format combinations from the maximum path metric values corresponding to the transport format combinations at the respective time points stored in the maximum path metric storage section 17.

The operation of the W-CDMA transmission rate estimation device in FIG. 7 will be described next with reference to FIGS. 8A and 8B. FIGS. 8A and 8B show the operation of the W-CDMA transmission rate estimation device according to the first embodiment. FIG. 8A shows transmission rate estimation processing. FIG. 8B shows maximum path metric calculation processing for each transport format combination. Assume that the data structure in FIG. 6 (Flexible Position) is to be handled.

According to a basic procedure, all transport format combinations are sequentially tried for the reception output 4 received from the channel separating section 40 in FIG. 2, and then the maximum likelihood transport format combination is selected.

As shown in FIG. 2, the reception output 4 received via one physical channel is separated into the data blocks 4A to 4C for the respective transport channels by the channel separating section 40 and input to the decoders 5A to 5C. In this case, the reception output 4 has the data structure described with reference to FIG. 6. Although the respective transport channels are discriminated from each other, they have not been recognized at this point of time in practice.

As shown in FIG. 8A, therefore, the first bit length combination, i.e., transport format combination 1, is selected (step 100), and the de-interleaver 51 of the decoder 5A performs de-interleaving for TrCH#1 on the basis of the selected combination (step 101). The rate control section 52 then adjusts the rate. The resultant bit string is input to the transmission rate estimation device in FIG. 7, and the maximum path metric calculation processing in FIG. 8B is started.

The operation principle of transmission estimation according to the present invention will be additionally described below.

Assume that an erroneous transport format combination is selected. In this case, since the above de-interleaving and rate adjusting functions require an accurate bit length for each transport channel, if an erroneous transport format combination, i.e., an erroneous bit length combination, is selected, operation errors occur.

As a result, the bit string input to the Viterbi decoding section completely differs from the intended bit string, and hence resembles randomly generated bits.

If a bit string regarded as a random string, which is not a normal encoded bit string (i.e., an original bit string at the time of encoding), is input to the Viterbi decoding section, the change rate of the path metric becomes lower than that when the normal encoded bit string is input.

It is reported that this difference becomes noticeable with an increase in signal-to-noise ratio (SNR) (see, e.g., reference 3: A. J. Viterbi and J. K. Omura; "Principles of Digital Communication and Coding", MCGRAW-HILL, NEW YORK, 1979).

By calculating the correlation strengths between the bit strings received for the respective transport format combinations and the normal encoded bit string, e.g., path metrics, and comparing them, a maximum likelihood transport format combination at that point can be determined. The present invention is a scheme using this characteristic.

Referring to FIG. 8B, the data 10 generated up to step 102 is input to the data storage section 11, and the branch metric generating section 12, adder 13, comparing/selecting section 14, and path metric storage section 15 start processing similar to the Viterbi decoding processing described above. First of all, the first node time point is selected in the trellis diagram (step 110), and the branch metric generating section 12 generates a branch metric (step 111).

The adder 13, comparing/selecting section 14, and path metric storage section 15 then perform ACS operation, and the path metric comparing section 16 selects the maximum path metric from path metrics in the respective states at the node time point (step 113). The selected path metric is stored in the maximum path metric storage section 17.

Until the node time point determined by a threshold value (step 114: NO), a shift is made to the next node time point on the trellis diagram (step 115). The maximum path metrics obtained by repeatedly executing steps 111 to 113 and using the respective transport format combinations are updated at the respective node time points, and the resultant data are stored in the maximum path metric storage section 17.

This threshold value represents the maximum number of node time points at which the above processing should be repeated on the trellis diagram. It is reported that this value is relatively small and four to five times the constraint length of a convolution code; about 100 steps will suffice, although it depends on SNR (reference 3).

If the node number on the trellis diagram reaches the threshold value (step 114: YES), the flow returns to step 104 in FIG. 8A. If another transport format combination is left (step 104: NO), the next transport format combination is selected (step 105), and steps 101 to 103 are repeatedly executed.

If these operations are completed for all the transport format combinations (step 104: YES), the estimating section 18 compares the maximum path metric values obtained for the respective transport format combinations with each other (step 106). A desired estimated transmission rate can be obtained by selecting the contents of a transport format combination applied when the maximum path metric value is obtained from them.

As described above, in the W-CDMA system, the Viterbi decoding section compares the correlation strengths between the respective transport format combinations and the normal encoded bit string to obtain a desired estimated transmission rate. As compared with the conventional method of using a predetermined data structure (Fixed Position), there is no need to generate a blank portion with no data called DTX (Discontinuous Transmission) in data, the step of adding or deleting this can be omitted, thereby improving the processing speed.

In addition, as compared with the method using CRCs, since no CRC check is made, there is no need to receive all the bits of one block. This makes it possible to eliminate a processing delay and shorten the processing time required for a CRC check. Therefore, transmission rate estimation can be processed at very high speed.

In the method using CRCs, in particular, even one bit in error will lead to an estimation failure. In the method according to this embodiment, since path metrics are compared with each other, bit errors are absorbed to a certain degree. As compared with the method of exchanging data with a transport format combination bit configuration, since there is no need to send such data, a great increase in channel capacity can be expected.

In comparing correlation strengths with each other, the Viterbi decoding section calculates maximum path metrics corresponding to the respective transport format combinations and compares them. Therefore, the path metrics used in Viterbi decoding processing can be used. This makes it possible to eliminate the necessity to add any special processing and suppress an increase in processing time or the size of a circuit portion.

FIGS. 9A and 9B show a comparison between the time required for transmission rate estimation processing in the present invention and that in the conventional method (Blind Rate Detection). FIG. 9A shows the time required to calculate a maximum path metric for one transport format combination, i.e., the time required for transmission rate estimation per transport format combination, in the present invention. FIG. 9B shows the time required for transmission rate estimation in the conventional method.

According to this embodiment, there is no need to obtain path metrics for all the input blocks of a reception output, and a maximum path metric can be calculated in about 100 steps at most, as described above. In addition, no CRC check is required. As is obvious from this, the present invention is superior to the conventional method in the processing time for transmission rate estimation. According to the present invention, the processing amount can be greatly reduced.

Figure 10:
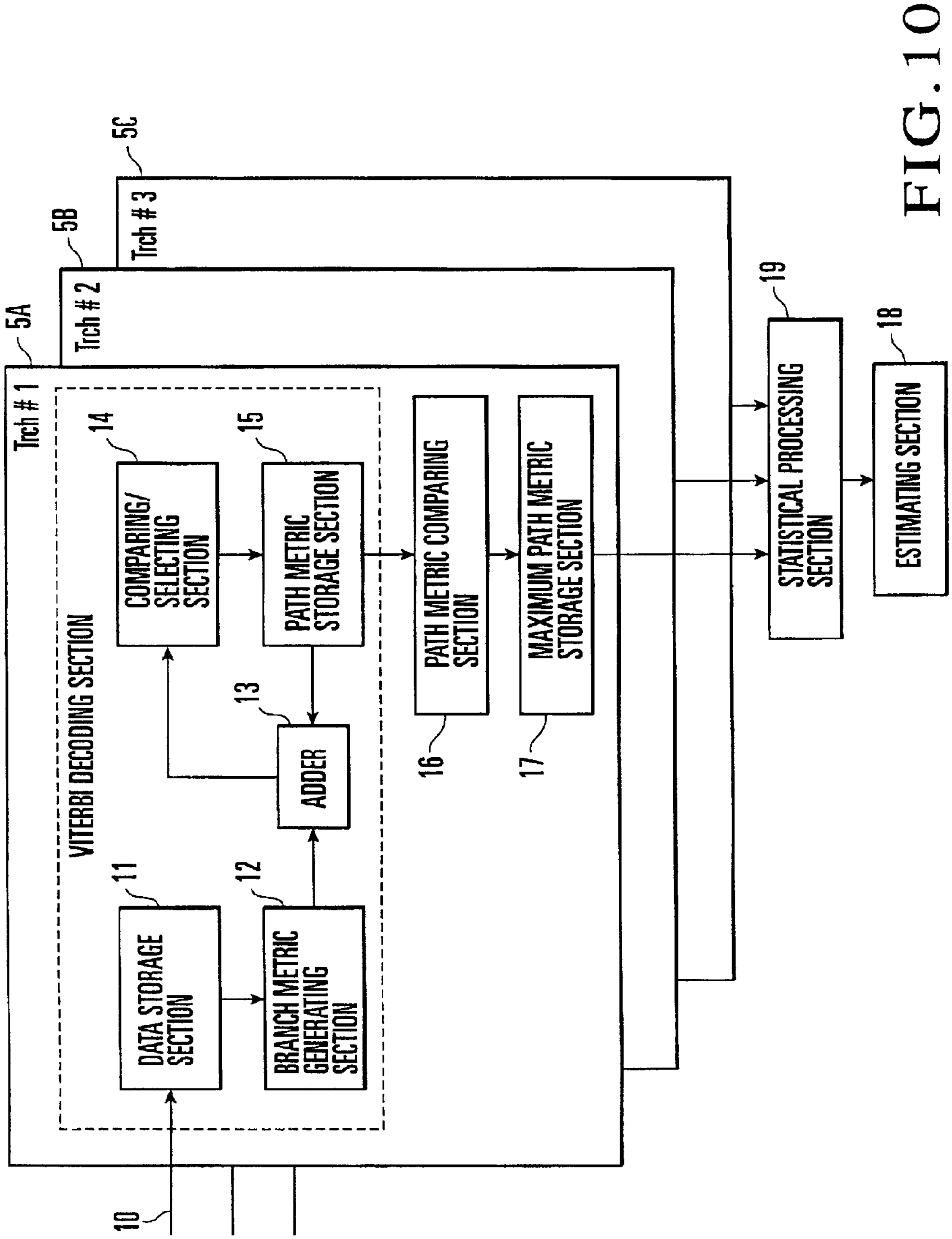
FIG. 10 is a functional block diagram showing a W-CDMA transmission rate estimation device according to the second embodiment of the present invention.
Figure 11:
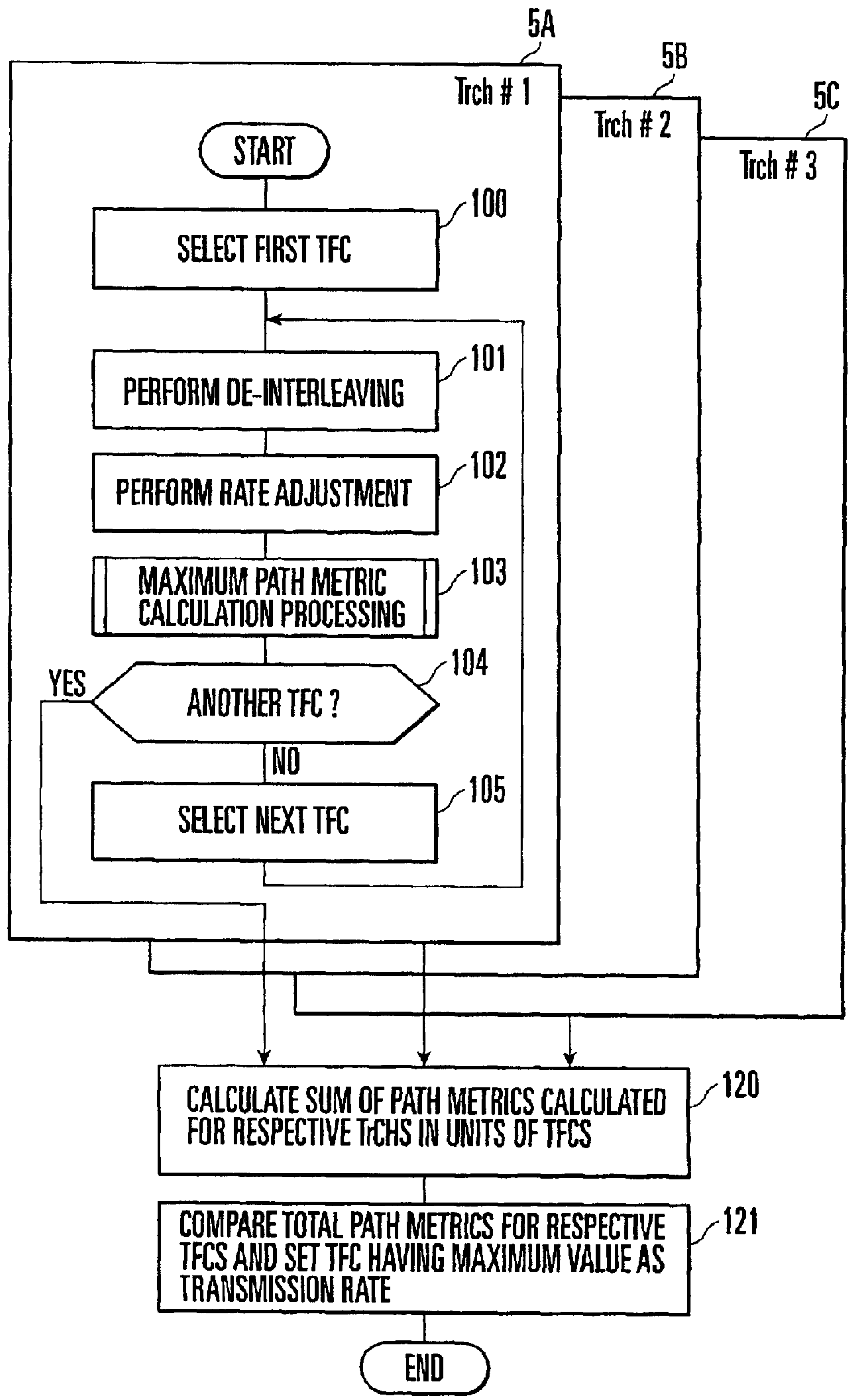
FIG. 11 is a flow chart showing W-CDMA transmission rate estimation processing according to the second embodiment of the present invention.

The second embodiment of the present invention will be described next with reference to FIGS. 10 and 11. FIG. 10 shows a W-CDMA transmission rate estimation device according to the second embodiment. FIG. 11 shows W-CDMA transmission rate estimation processing according to the second embodiment. The first embodiment has exemplified the case where the present invention is applied to only TrCH#1. In this embodiment, however, the above processing is concurrently performed for the remaining channels TrCH#2 to TrCH#4 as well.

In this embodiment, when one transport format combination is selected, bit lengths for all the transport channels are simultaneously determined, as described above. By using the respective bit lengths, therefore, the transmission rate estimation processing in FIGS. 8A and 8B can be performed for all the transport channels at once. Assume that in this case, convolution encoding processing is performed for all the transport channels, and decoding processing is performed by Viterbi decoding.

In this case, as shown in FIG. 10, as compared with the arrangement in FIG. 7 described above, data storage sections 11, branch metric generating sections 12, adders 13, comparing/selecting sections 14, path metric storage sections 15, path metric comparing sections 16, and maximum path metric storage sections 17 are provided in parallel for the respective transport channels. This arrangement also includes a statistical processing section 19 for statistically processing the maximum path metric values stored in the maximum path metric storage sections 17 for the respective transport channels in units of transport format combinations.

Referring to FIG. 11, in steps 100 to 105, the maximum path metric for each respective transport format combination is calculated and stored in the path metric storage section 15.

This processing is concurrently performed for each transport channel, and the calculated maximum path metrics are statistically processed, e.g., added, for each transport format combination by the statistical processing section 19 (step 120).

As the values to be added for each transport channel, the maximum path metrics obtained by using each transport format combination are used, and a normalized value, i.e., a statistical processing result, is calculated.

The results obtained in this manner are compared with each other for the respective transport format combinations to select a transport format combination having the maximum value (step 121). As a consequence, a desired estimated transmission rate is obtained.

In each embodiment described above, in transmission rate estimation, maximum path metrics themselves for the respective transport format combinations are compared with each other. However, the present invention is not limited to this, and any values that represent the correlation strengths between input bit strings and a normal encoded bit string can be used. For example, the difference between path metrics, the difference between a maximum path metric and a minimum path metric, or the difference between a largest path metric and a second largest path metric can be used in place of a maximum path metric. Alternatively, an increase in path metric may be used.

Another method based on continuity of likelihood paths is also available, in which points which have maximum path metrics at the respective nodes on a trellis diagram but are not located on likelihood paths are counted, and the corresponding transport format combination is determined in accordance with the count.

Alternatively, the following method may be used. An arbitrary transport format combination is selected to perform Viterbi decoding of data, and the result is encoded again. The correlation between the encoded data and the data before Viterbi decoding is then calculated. A transport format combination is determined in accordance with the magnitude of the calculated correlation.

As has been described above, according to the present invention, a data transmission rate is estimated by selecting the maximum likelihood transport format combination of a plurality of transport format combinations indicating bit length combinations constituting the respective transport channels on the basis of the correlation strengths between the bit strings of the data subjected to Viterbi decoding and the normal encoded bit string. As compared with the conventional method of using a predetermined data structure (Fixed Position), there is no need to generate a blank portion having no data called DTX (Discontinuous Transmission) in data, and hence no step of adding or deleting it is required, thereby increasing the processing speed.

In addition, as compared with the method using CRCs, since no CRC check is made, there is no need to receive all the bits of one block. This makes it possible to eliminate a processing delay and shorten the processing time required for a CRC check. Therefore, transmission rate estimation can be processed at very high speed.

What is claimed is:

1. A W-CDMA transmission rate estimation method comprising: selecting a maximum likelihood transport format combination of a plurality of transport format combinations representing bit length combinations constituting a plurality of transport channels, each having a variable bit length, on the basis of correlation strengths between a normal encoded bit string and bit strings of data; said bit strings of data obtained by performing Viterbi decoding processing for data, of a reception output constituted by the respective transport channels, which corresponds to an arbitrary transport channel, and estimating a data transmission rate on the basis of the selected combination.

2. A method according to claim 1, further comprising using a plurality of path metric values calculated in the Viterbi decoding processing as values indicating the correlation strengths.

3. A method according to claim 2, further comprising storing, for each of the transport format combinations, a maximum path metric value obtained by using the transport format combination, and selecting a maximum likelihood transport format combination by comparing the stored maximum path metric values for the respective stored transport format combinations.

4. A method according to claim 2, further comprising concurrently calculating maximum path metric values, for the respective transport channels, which are obtained by concurrently performing the Viterbi decoding processing for the respective transport channels when the respective transport format combinations are used, statistically processing the respective path metric values obtained for the respective transport channels in units of transport format combinations, and selecting a maximum likelihood transport format combination on the basis of the statistical processing result.

5. A W-CDMA transmission rate estimation device comprising: transmission rate estimating means for performing Viterbi decoding processing for data, of a reception output constituted by a plurality of transport channels each having a variable bit length, which corresponds to an arbitrary transport channel, and means for selecting a maximum likelihood transport format combination of a plurality of transport format combinations representing bit length combinations constituting the respective transport channels, thereby estimating a data transmission rate.

6. A W-CDMA transmission rate estimation device for estimating a data transmission rate by performing Viterbi decoding processing for data, of a reception output constituted by a plurality of transport channels each having a variable bit length, which corresponds to an arbitrary transport channel, comprising:

maximum path metric comparing means for comparing a plurality of path metric values obtained for the respective transport format combinations when the transport format combinations are used in the Viterbi decoding processing, thereby selecting a maximum path metric value;

maximum path metric storage means for storing the maximum path metric value selected by said maximum path metric comparing means; and estimating means for comparing the maximum path metric values for the respective transport format combinations stored in said maximum path metric storage means, and selecting a maximum likelihood transport format combination, thereby estimating a data transmission rate.

7. A device according to claim 6, wherein said maximum path metric comparing means and said maximum path metric storage means are provided in parallel for the respective transport channels, said device further comprises statistical processing means for statistically processing the maximum path metrics stored in said respective maximum path metric storage means for the respective transport format combinations, and said estimating means compares the statistical processing results obtained by said statistical processing means for the respective transport format combinations, and selects a maximum likelihood transport format combination, thereby estimating a data transmission rate.

8. A method according to claim 2, further comprising:

selecting a maximum path metric among transport format combinations from maximum path metric values corresponding to said transport format combinations stored in a maximum path metric storage section.

9. A device according to claim 5, wherein the transmission rate estimating means comprises:

a Viterbi decoding section comparing correlation strengths between a maximum path metric value and a normal encoded bit string.

10. A device according to claim 7, wherein said plurality of transport channels are processed concurrently.

11. A method according to claim 1, further comprising:

selecting said maximum likelihood transport format combination on the basis of correlation strengths between a maximum path metric and a minimum path metric.

12. A method according to claim 1, further comprising:

selecting said maximum likelihood transport format combination on the basis of correlation strengths between a largest path metric and a second largest path metric.

* * * * *